Aug. 22, 1939.    E. E. WEMP    2,170,172
CLUTCH CONTROL
Filed March 3, 1938    2 Sheets-Sheet 1
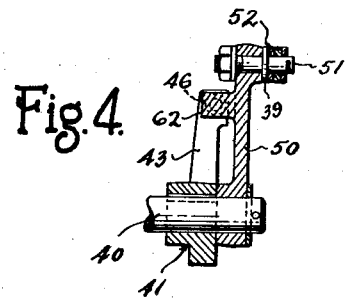
Fig. 4.
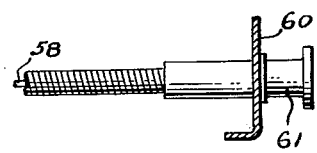
Fig. 1.
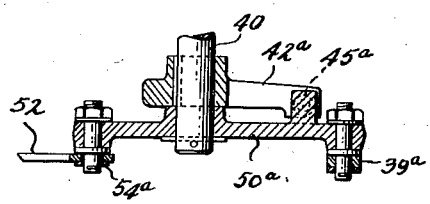
Fig. 6.
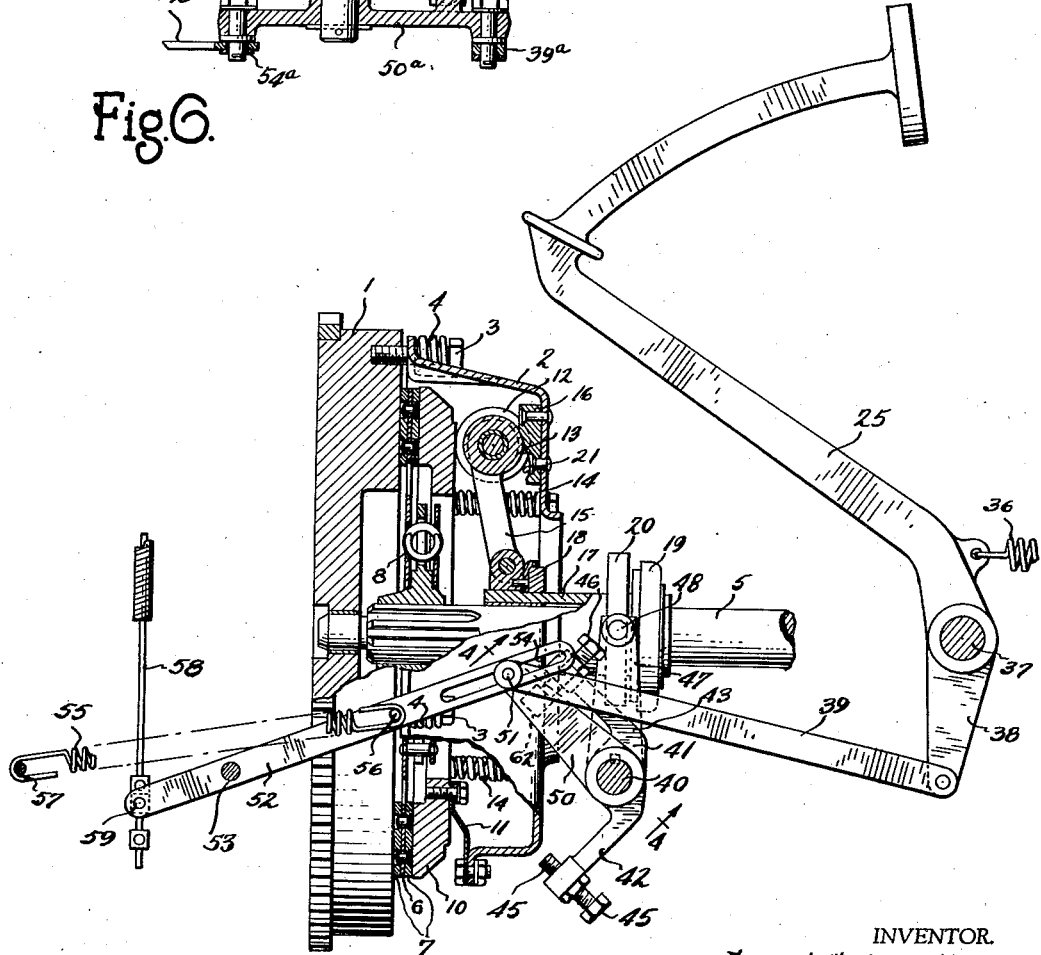
INVENTOR.
Ernest E. Wemp
BY Barnes, Kisselle, Laughlin & Raisch
ATTORNEYS

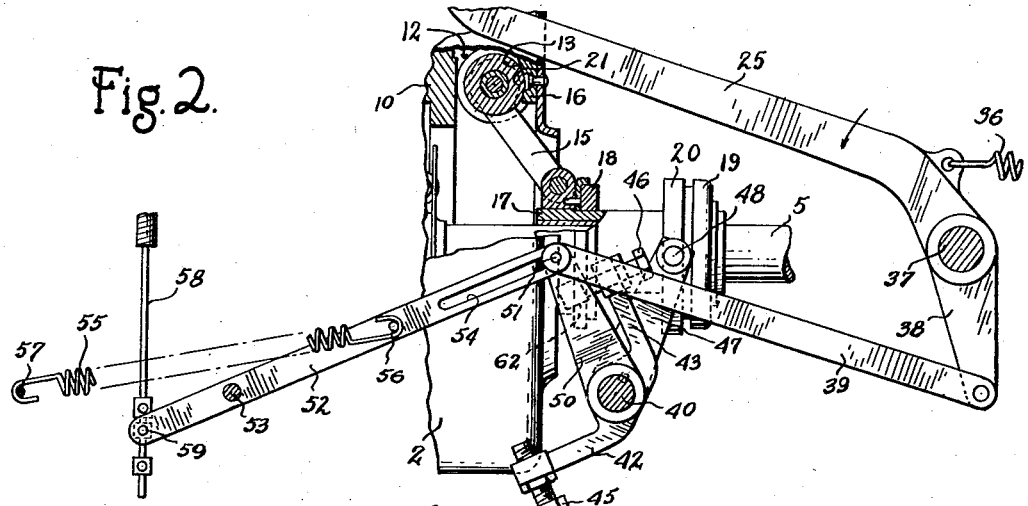
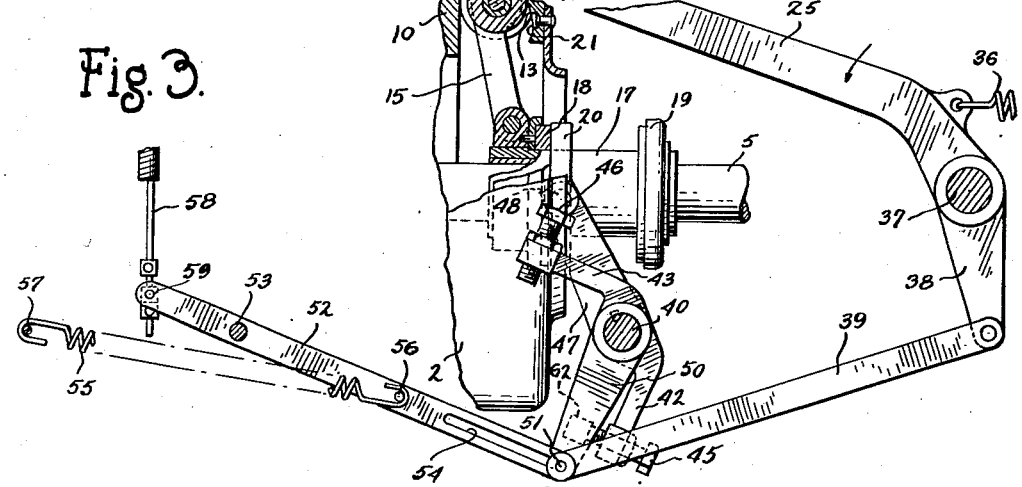
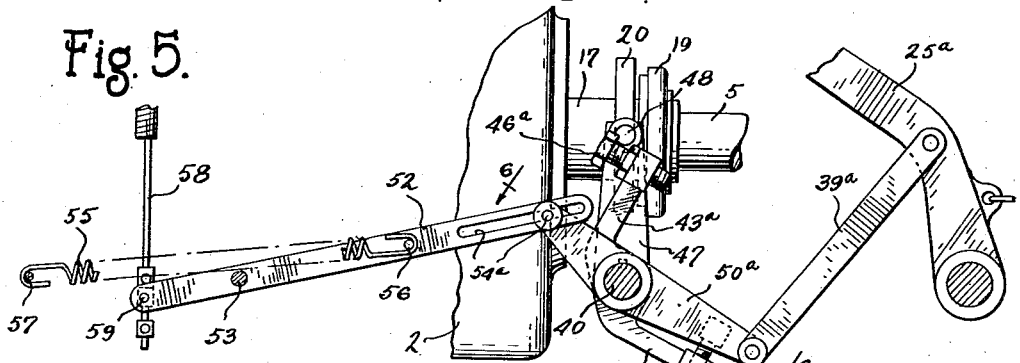

Patented Aug. 22, 1939

2,170,172

UNITED STATES PATENT OFFICE 2,170,172

CLUTCH CONTROL

Ernest E. Wemp, Detroit, Mich.

Application March 3, 1938, Serial No. 193,720

10 Claims. (Cl. 192—99)

This invention relates to a clutch control. It has to do particularly with a control where control forces in opposite directions are required to be applied to the clutch.

The particular clutch shown herein to exemplify the control is a centrifugal type of clutch which forms the basis of a separate application. To control this clutch or others of a similar nature, forces must be applied thereto in one direction at certain times and in the opposite direction at other times. In accordance with the invention a control mechanism is provided wherein these oppositely directed forces may be applied to the clutch by an element such as the clutch pedal to which operating forces are applied in only one direction. The forces are transmitted from the pedal to the clutch through mechanism capable of reversing the direction in which the forces are applied to the clutch.

In the accompanying drawings:

Fig. 1 is a general view illustrating the control and clutch of the centrifugal type with which the control may be used, the clutch being illustrated in engaged position.

Fig. 2 is a view of the clutch control apparatus illustrating one substantially extreme position for clutch disengagement.

Fig. 3 is a view similar to Fig. 2 showing the control in substantially extreme position for clutch engagement.

Fig. 4 is a sectional view taken substantially on line 4—4 of Fig. 1.

Fig. 5 is a view similar to Figs. 2 and 3 illustrating a modified arrangement.

Fig. 6 is a sectional view taken substantially on line 6—6 of Fig. 5.

The clutch as illustrated includes a flywheel 1 to which a cover plate 2 is attached by cap screws 3 with interposed springs 4. The springs 4 permit the cover plate to back away from the flywheel. A driven shaft is shown at 5 on which is mounted a driven disc 6 with suitable facing elements 7, the disc being connected to the driven shaft in any suitable way, as for example by a vibration dampening construction generally illustrated at 8. A pressure plate is shown at 10 carried by the cover plate through the means of a plurality of steel spring segments or plates 11. These plates serve to drive and center the pressure plate from the cover plate and serve to permit the pressure plate to shift axially.

Centrifugal weight means in the form of roller assemblies 12 function on surfaces of the pressure plate and upon the inclined surface 13 of inserts 16 on the cover plate. The roller assemblies are driven by reason of roller 12 overlapping the edges of the inserts 16. The roller assemblies may be provided in suitable numbers, and each assembly has a link 15 pivotally connected to a sleeve 17 which is axially shiftable and which is provided with bearings or collars 18 and 19 which are axially spaced relative to each other. A control collar 20 is located between the bearing collars 18 and 19.

As shown in Fig. 1 the clutch is engaged. At normal idling speed of the engine the roller assemblies 12 lie in the deepest part 21 of the recesses in the inserts 16 and the clutch will be disengaged. The clutch may be held normally disengaged by retractor springs 14 connected to the cover plate and pressure plate, although the flexible plates 11 may be arranged to normally retract the pressure plate. At this time the sleeve 17 will be shifted to the right, and the inner ends of the links 15 will, of course, follow the sleeve 17. As the engine is accelerated above idling speed the roller assemblies shift outwardly to the position shown in Fig. 1. The roller assemblies function on the inclined surface 13 and urge the pressure plate 10 to the left as Fig. 1 is viewed to pack the driven disc between the flywheel and the pressure plate. The springs 4 may be compressed to let the cover plate back away in taking the reaction. When fully engaged the link 15 assumes an irreversible angle so that the clutch remains engaged even when the engine is reduced to idling speed or brought to a complete stop. The clutch may be disengaged manually by shifting the collar 20 to the right as Fig. 1 is viewed; in this action the collar 20 engages the bearing 19 and shifts the sleeve 17 to the right, thus breaking the irreversible angle and causing clutch disengagement. The clutch may be engaged independently of centrifugal force by moving the collar to the left, in which action it engages the bearing 18 and forces the roller assemblies outwardly into the position as shown in Fig. 1.

As mentioned above this particular clutch construction is covered in a separate application, and it is shown therein to provide an environment for the form of control means covered herein, although a clutch of this general nature enters into the combination with the control mechanism.

The control mechanism takes the form of a clutch pedal 25 more or less of the conventional type arranged to be pushed down or depressed for clutch control and normally held retracted by a spring 36. This pedal is journaled on a stud or shaft 37 and has a projecting end 38 pivotally connected to a link 39.

A clutch rock shaft is illustrated at 40, and mounted on the rock shaft to rotate the same is a member 41 having an arm 42 and an arm 43, and these arms project to opposite sides of the rock shaft. Adjustable abutment screws 45 and 46 may be carried by these arms. A yoke 47 is keyed to the rock shaft and is connected to the collar 20 as at 48.

Journaled on the shaft 40 is an arm 50 which carries a stud 51 to which the link 39 is pivoted. A lever 52 has a fixed pivot as at 53 and an elongated slot 54 fitting over the stud 51. A spring 55 connects to the lever 52 as at 56 and has a fixed support at its opposite end as at 57. The spring and lever 52 constitute an over-center arrangement. The lever 52 is a control lever and it may be operated by suitable means, as for example, a Bowden wire 58, one end of which is connected to the link 52 as at 59 and the other end of which may extend to a convenient location for operation, as for example, the instrument panel 60 of the vehicle where it may be equipped with an operating button 61. The arm 50 has an abutment 62 arranged to abut against the screw 45 or the screw 46.

This structure operates as follows: The normal position of the parts is preferably that as shown in Fig. 1. When the pedal is pushed down or depressed, the link 39, acting as a tension member, rocks the arm 50 clockwise and it engages the stop screw 46 and thus rotates the rock shaft and shifts the collar 20 to the right. A slight depression of the pedal will cause the collar 20 to engage the bearing 19 to shift the sleeve 17 to the right enough to break the irreversible angle of the links 15, and the clutch will disengage itself, provided the engine is operating at substantially idling speed or is at rest. However, if it is desired to manually disengage the clutch even though it is engaged due to centrifugal force, the pedal may be pushed substantially all the way down, as illustrated in Fig. 2, thus retracting the roller assembly 12 and permitting clutch disengagement. When the pedal is released it may return to the Fig. 1 position from the Fig. 2 position, and there is sufficient clearance between the bearings 18 and 19 to permit this while the clutch remains disengaged at idling speeds of the engine or if the engine is at rest.

When a vehicle approaches a traffic light or has to come to a stop for any reason and the engine has decelerated to about idling speed, the operator may slightly depress the pedal and the clutch releases itself. The transmission may now be placed in gear and the clutch automatically engages upon acceleration, thus causing the vehicle to move. With an automatic transmission no further actuation is necessary. However, the clutch may be disengaged the requisite number of times in order to shift the transmission through its several gear ratios where a conventional transmission is used.

Now it may be desirable at times to engage the clutch independently of or in the absence of centrifugal force in order to start the engine by towing or pushing the vehicle or in order to leave the vehicle parked with the clutch engaged and the transmission in gear. Of course, this may be done in the normal action inasmuch as the clutch will remain engaged when the engine is brought to a stop from an R. P. M. sufficiently high to have previously caused full clutch engagement. However, to manually cause clutch engagement the Bowden wire is actuated to throw the lever 52 over center. In the set-up illustrated a knob 61 may be pulled, thus rocking the lever 52 clockwise and extending the spring 55 until it moves over the center of the fixed pivot point 53, whereupon the spring will cause the lever 52 to take the position illustrated in Fig. 3. In this action the arm 50 is rocked on the rocker shaft from the position shown in Fig. 1 to that illustrated in Fig. 3, in which action the stud 51 shifts in the elongated slot 54. Now when the pedal is pushed down or depressed the arm 50 is rocked counter-clockwise and it engages the abutment screw 45 and the shaft and yoke are rocked in a direction such as to cause the collar 20 to shift to the left. When the pedal is pushed substantially all the way down as shown in Fig. 3, the sleeve 17 is shifted far enough to the left to cause full clutch engagement and to cause the links 15 to assume the irreversible angle. With the clutch thus engaged the pedal may be released and it will return to the normal position illustrated in Fig. 1, and there is sufficient clearance between the bearings 19 and 18 to permit the collar 20 to return to the Fig. 1 position without striking the bearing 19. When it is again desired to operate the vehicle in a normal manner, the Bowden wire is actuated to return the lever 52 to the Fig. 2 position. The slot and pin connection 51—54 permits the parts to assume the extreme positions shown in Figs. 2 and 3; in fact in all pedal actuation the stud 51 slides in the slot 54.

A modified arrangement is shown in Figs. 5 and 6 wherein like reference characters are applied to previously described like parts, and wherein similar but modified parts are identified by the same reference characters, with the additional character *a*. In this form the link 39*a* is a compression link. With the parts in the position illustrated in Fig. 5, the link 50*a* engages abutment screw 45*a* when the pedal is depressed, thus to turn the rocker shaft clockwise and cause clutch disengagement due to the collar 20 shifting to the right and engaging bearing 19. The lever 52 may be shifted over center by the Bowden wire in the manner as above described, causing the arm 50*a* to swing counter-clockwise as Fig. 5 is viewed so that it will engage the abutment screw 46*a* to thus cause clutch engagement when the pedal is depressed. As illustrated in Fig. 5 the member 50*a* is a cross member having oppositely extending arms with the compression link 39*a* connected to one arm and with the lever 52 having a pin and slot connection 54*a* with the other arm, whereas in the previously described form the link 39 and lever 52 were connected to the same stud.

Thus in both forms of the invention it will be noted that there is a linkage arranged to have a throw over center action, by means of which movement of the pedal in one direction, namely, that of depression, may transmit controlling movements to the clutch in substantially opposite directions.

I claim:

1. In combination with a clutch requiring control movements to be delivered thereto in substantially opposite directions, a movable control member, a shiftable member operably associated with the clutch, and means connecting the control member and shiftable member including throw over center linkage adjustable at will independently of movement of the control member for shifting the shiftable member at will in substantially opposite directions upon movement of the control member in one direction depending upon the position of the linkage.

2. In combination with a clutch requiring control movements to be delivered thereto in substantially opposite directions, a movable control member, a shiftable member operably associated with the clutch, a rockable element arranged to be rocked in opposite directions for transmitting substantially opposite movements to the shiftable member, means for transmitting motion from the control member to the element, and a throw over center lever for effecting optionally one of two operable connections between said means and said element so that the element may be optionally rocked in opposite directions upon control movement of the control member in one direction.

3. In combination with a clutch requiring control movements to be delivered thereto in substantially opposite directions, a movable control member, a shiftable member operably associated with the clutch, a movable element arranged to be moved in opposite directions for transmitting substantially opposite movements to the shiftable member, means for transmitting motion from the control member to the element, and a throw over center lever for effecting optionally one of two operable connections between said means and said element so that the element may be optionally moved in opposite directions upon control movement of the control member in one direction.

4. In combination with a clutch requiring control movements to be delivered thereto in substantially opposite directions, a movable control member, a shiftable member operably associated with the clutch, a movable element arranged to be moved in opposite directions for transmitting substantially opposite movements to the shiftable member, means for transmitting motion from the control member to the element, and means operable for effecting optionally one of two operable connections between said means and said element so that the element is moved optionally in opposite directions upon control movement of the control member in one direction.

5. In combination with a clutch of an automotive vehicle requiring control movements to be delivered thereto in substantially opposite directions, a clutch pedal arranged to be depressed for delivering control movements to the clutch, a shiftable member operably associated with the clutch, and throw over center linkage establishing optionally one of two connections between the pedal and the shiftable member for shifting the shiftable member optionally in substantially opposite directions upon depressing movement of the pedal.

6. In combination with a clutch requiring clutch control movements to be delivered thereto in substantially opposite directions, a clutch pedal, a shiftable member operably associated with the clutch, a rock shaft having a connection with the shiftable member, a cross member on the rock shaft for rocking the same and having two abutment devices, and means for establishing optionally an operable connection between the pedal and the said two abutment devices whereby movement of the pedal when depressed may transmit optionally opposite movements to said cross member, shaft and shiftable member.

7. In combination with a clutch requiring clutch control movements to be delivered thereto in substantially opposite directions, a clutch pedal arranged to be depressed for clutch control, a shiftable member operably associated with the clutch, a rock shaft for shifting said member, an element fixed to the rock shaft having abutments extending to opposite sides of the rock shaft, an arm rockable on the rock shaft and operably connected to the pedal, and means for optionally positioning the arm for engagement with one of the two abutments for rocking the element in opposite directions optionally upon depression of the clutch pedal.

8. In combination with a clutch requiring clutch control movements to be delivered thereto in substantially opposite directions, a clutch pedal arranged to be depressed for clutch control, a shiftable member operably associated with the clutch, a rock shaft for shifting said member, an element fixed to the rock shaft having abutments extending to opposite sides of the rock shaft, an arm rockable on the rock shaft and operably connected to the pedal, and a throw over center lever connected to the arm and operable to optionally position the arm for engagement with one of the said two abutments for rocking the element in opposite directions optionally upon depression of the clutch pedal.

9. In combination with a clutch requiring clutch control movements to be delivered thereto in substantially opposite directions, a clutch pedal arranged to be depressed for clutch control, a shiftable member operably associated with the clutch, a rock shaft for shifting said member, an element fixed to the rock shaft having abutments extending to opposite sides of the rock shaft, an arm rockable on the rock shaft and operably connected to the pedal, a lever having a fixed pivot and a pin and slot connection with the arm, a spring acting upon the lever having a throw over center action, and means operable to throw the lever over center to optionally position the arm for engagement with one of the two abutments to rock the element optionally in opposite directions upon depression of the pedal.

10. In combination with a clutch requiring clutch control movements to be delivered thereto in substantially opposite directions, a clutch pedal arranged to be depressed for clutch control, a shiftable member operably associated with the clutch, a rock shaft for shifting said member, an element fixed to the rock shaft having abutments extending to opposite sides of the rock shaft, an arm rockable on the rock shaft and operably connected to the pedal, a throw over center lever connected to the arm, means movable at a point remote from the lever to throw the same over center optionally to establish an operable connection between the arm and one of said two abutments to rock the element in opposite directions optionally upon depression of the pedal.

ERNEST E. WEMP.